(12) United States Patent
Navarro

(10) Patent No.: US 7,893,867 B2
(45) Date of Patent: Feb. 22, 2011

(54) COMMUNICATIONS RADAR SYSTEM

(75) Inventor: Julio Navarro, Kent, WA (US)

(73) Assignee: The Boeing Company, Chicago, IL (US)

( * ) Notice: Subject to any disclaimer, the term of this patent is extended or adjusted under 35 U.S.C. 154(b) by 91 days.

(21) Appl. No.: 12/363,347

(22) Filed: Jan. 30, 2009

(65) Prior Publication Data

US 2010/0194640 A1 Aug. 5, 2010

(51) Int. Cl.
*G01S 13/00* (2006.01)
(52) U.S. Cl. ........................... 342/175; 342/157
(58) Field of Classification Search ............ 342/57
See application file for complete search history.

(56) References Cited

U.S. PATENT DOCUMENTS

| | | | | |
|---|---|---|---|---|
| 4,010,759 | A * | 3/1977 | Boer | 607/36 |
| 4,675,628 | A * | 6/1987 | Rosen | 333/164 |
| 5,142,255 | A | 8/1992 | Chang et al. | |
| 5,248,979 | A | 9/1993 | Orme et al. | |
| 6,424,313 | B1 | 7/2002 | Navarro et al. | |
| 6,580,402 | B2 | 6/2003 | Navarro et al. | |
| 6,670,930 | B2 | 12/2003 | Navarro | |
| 6,714,163 | B2 | 3/2004 | Navarro et al. | |
| 6,744,411 | B1 | 6/2004 | Osterhues et al. | |
| 6,900,765 | B2 | 5/2005 | Navarro et al. | |
| 6,952,184 | B2 | 10/2005 | Sievenpiper et al. | |
| 6,989,791 | B2 * | 1/2006 | Navarro et al. | 343/700 MS |
| 7,109,935 | B2 | 9/2006 | Saint Clair et al. | |
| 7,187,342 | B2 | 3/2007 | Heisen et al. | |
| 7,287,987 | B2 | 10/2007 | Heisen et al. | |
| 7,289,078 | B2 | 10/2007 | Navarro | |
| 7,312,751 | B1 | 12/2007 | Voyce et al. | |
| 7,332,048 | B2 | 2/2008 | Navarro et al. | |
| 7,417,598 | B2 | 8/2008 | Navarro et al. | |
| 2002/0003488 | A1 * | 1/2002 | Levin et al. | 342/70 |
| 2004/0012533 | A1 * | 1/2004 | Navarro et al. | 343/776 |
| 2004/0017322 | A1 * | 1/2004 | Bostwick et al. | 343/776 |
| 2005/0259008 | A1 * | 11/2005 | Gustafsson | 343/700 MS |
| 2007/0087758 | A1 | 4/2007 | Norris et al. | |
| 2009/0000393 | A1 * | 1/2009 | Nyfors et al. | 73/861.19 |
| 2009/0001980 | A1 * | 1/2009 | Geren et al. | 324/252 |

OTHER PUBLICATIONS

International Search Report, corresponding to International Patent Application No. PCT/US2010/021673, dated Mar. 2, 2010.
Written Opinion, corresponding to International Patent Application No. PCT/US2010/021673, dated Mar. 2, 2010.

* cited by examiner

*Primary Examiner*—Thomas H Tarcza
*Assistant Examiner*—Timothy A Brainard
(74) *Attorney, Agent, or Firm*—R. Brian Drozd; Moore & Van Allen PLLC

(57) ABSTRACT

A system for a mobile ad-hoc communications network includes a single antenna aperture and a phased array antenna comprising a plurality of radiators communicating electromagnetically via the single antenna aperture. The system may also include a control circuit communicatively connected to the phased array antenna. The control circuit may include a communications module for transmitting and receiving communication data via the phased array antenna through the single antenna aperture and a radar module for transmitting and receiving radar signals via the phased array antenna through the single antenna aperture.

22 Claims, 6 Drawing Sheets

COMMUNICATIONS RADAR SYSTEM

BACKGROUND

The present disclosure relates to electromagnetic communication and sensing systems, and more particularly to a method and system for radio communications and sensing using a single antenna aperture.

Currently, various electromagnetic devices are available based on the specific use desired. For example, two-way radio communication devices have been utilized on vehicles to communicate with other vehicles or a fixed base station. These communication devices may use a specific antenna aperture to transmit and receive data. This aperture is designed such that the communication device is the only device that could use the aperture for communications.

Another example of an electromagnetic device includes a radar system that uses an antenna to detect objects within a certain proximity of the antenna. The antenna of this radar must have an antenna aperture that is used only by the radar. There is no known system that combines communications devices and radar devices because both devices require a separate antenna aperture, different electronics, different operational frequencies and different inputs. As such, systems that need to use both communication and radar capabilities have to have two separate devices with separate electronics and separate antennas. Having to employ separate devices for these functionalities is expensive and results in added weight due to having to employ multiple devices, which may be undesirable for systems where weight should be minimized, such as aerospace vehicles, terrestrial vehicles, planetary rovers and the like.

BRIEF SUMMARY

In accordance with an embodiment of the present disclosure, a system for a mobile ad-hoc communications network includes a single antenna aperture and a phased array antenna comprising a plurality of radiators communicating electromagnetically via the single antenna aperture. The system may also include a control circuit communicatively connected to the phased array antenna. The control circuit may include a communications module for transmitting and receiving communication data via the phased array antenna through the single antenna aperture and a radar module for transmitting and receiving radar signals via the phased array antenna through the single antenna aperture.

In accordance with another embodiment of the present disclosure, a system for communications and radar may include a common aperture and a phased array antenna coupled to the single aperture. The phased array antenna comprises a wide angle impedance matching (WAIM) layer comprising a dielectric layer and a radiator layer attached to the WAIM layer and comprising at least one probe and at least one centerpin spaced apart from the at least one probe. The phased array antenna may also include a circuit connected to the radiator layer of phase array antenna to deliver power to the at least one probe and the centerpin. The circuit may include a communications module for transmitting and receiving data via the phased array antenna through the single antenna aperture. The circuit may also include a radar module for transmitting and receiving radar data via the phased array antenna through the single antenna aperture.

In accordance with another embodiment of the present disclosure, a method for transmitting and receiving communication and radar signals may include transmitting and receiving communication signals and radar signals through a single antenna aperture of a phase array antenna. The method may also include directing the received radar signals to a radar module for transmitting and receiving radar signals. The method may further include directing the received communications signals to a communications module for transmitting and receiving communications signals.

Other aspects and features of the present disclosure, as defined solely by the claims, will become apparent to those ordinarily skilled in the art upon review of the following non-limited detailed description of the disclosure in conjunction with the accompanying figures.

DETAILED DESCRIPTION

The following detailed description of embodiments refers to the accompanying drawings, which illustrate specific embodiments of the disclosure. Other embodiments having different structures and operations do not depart from the scope of the present disclosure.

Figure 1:
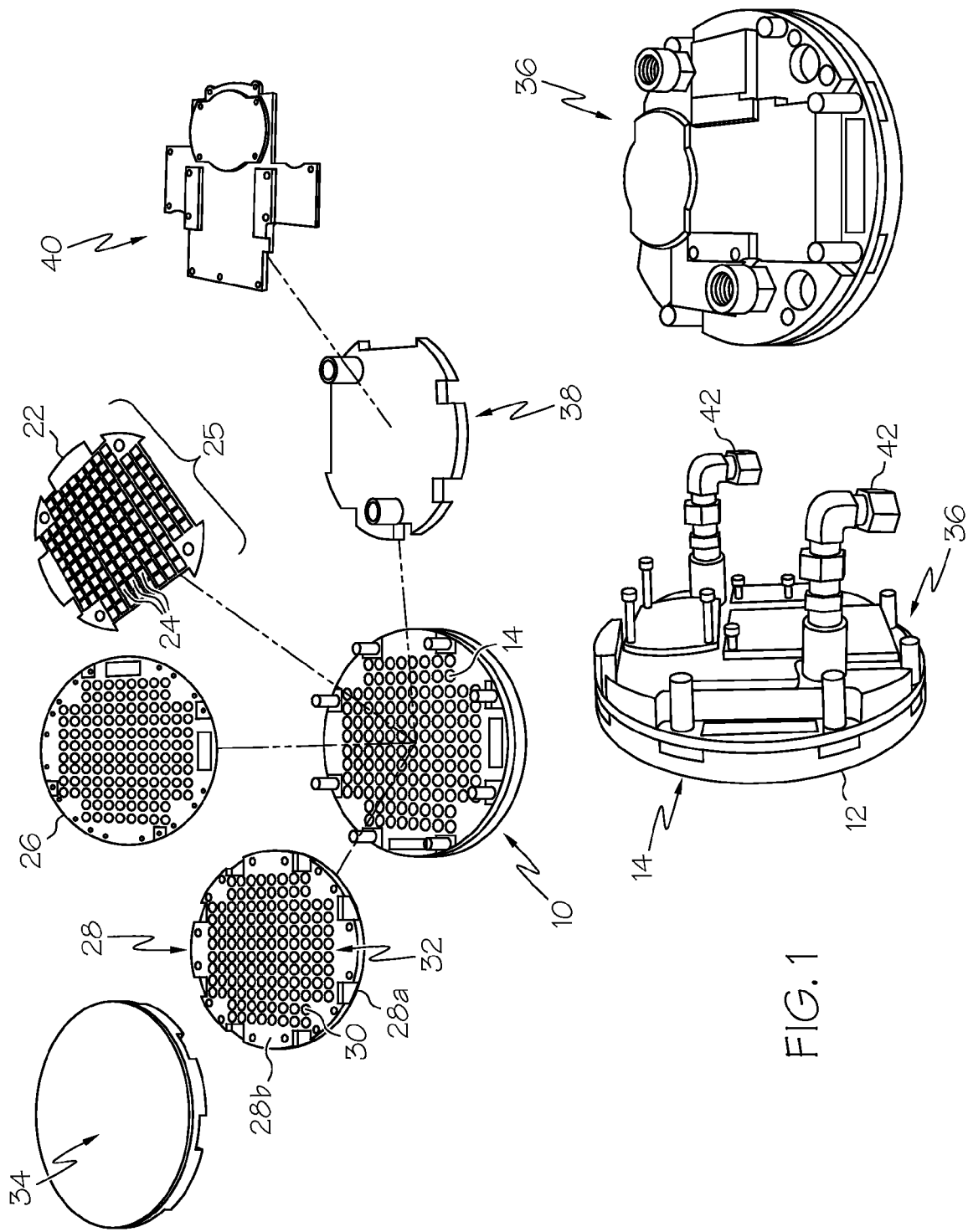
FIGS. 1 is an exploded diagram of an example of a phased array antenna of a system for a communications radar system in accordance with an embodiment of the present disclosure.

FIG. 1 is an exploded diagram of an example of a phased array antenna 10 of a system for a communications radar system in accordance with an embodiment of the present disclosure. The front end 12 of the phased array antenna 10 may conform to the surface of a structure (not shown) to which the phased array antenna 10 is mounted to. In this regard, the phased array antenna 10 can be mounted to a wide variety of structures including a number of different types of moving structures, vehicles, or any other structure. In one application, the phased array antenna 10 is mounted to a vehicle (not shown), such as an aircraft, aerospace vehicle, terrestrial vehicle, rover or other vehicle, so as to provide a wide variety of communications and/or radar capabilities via a single antenna aperture.

As assembled, the phased array antenna 10 includes a plurality of RF modules 14. An example of an RF module that may be used for the RF module 14 will be described in more detail herein with reference to FIG. 2.

The phased array antenna 10 may also include a shim element layer 22 defining a number of openings 24 arranged in a predefined pattern or an array 25. The RF modules 14 are mounted within the respective openings defined by the shim element 22 such that the RF modules 14 are also disposed in a similar predefined pattern.

The phased array antenna 10 also may include a multilayer printed wiring board (PWB) layer 26 having a number of wires, conductive traces or the like. The shim element 22 is disposed upon the PWB 26 such that the RF modules 14 make contact with the multilayer PWB 26 and, in particular, with respective wires or conductive traces carried by the PWB 26. Although not illustrated, the PWB 26 may be also generally connected to at least one control circuit, a power supply, ground and/or a clock, as well as various address and data lines. The PWB 26 may supply power, ground and clock signals to the RF modules 14, while permitting data to be transmitted to and from the RF modules 14.

The phased array antenna 10 of FIG. 1 also includes a honeycomb layer 28 having a pair of opposed planar surfaces 28a, 28b and defining a plurality of passages 30 extending between the opposed planar surfaces. The honeycomb layer structure 28 defines the passages 30 so as to be arranged in the same predefined pattern or array as the pattern 25 specified above with respect to the shim element 22. As such, the RF modules 14 mounted within the openings are aligned with respective passages 30 defined by the honeycomb structure 28. The honeycomb structure 28 may be formed of various materials, but is typically formed of a metal, such as aluminum, a conductively coated or conductively plated plastic, a metal matrix composite or a conductively coated composite material. For example, the honeycomb structure 28 may be made from Rexolite as manufactured by C-LEC Plastics, Inc. of Philadelphia, Pa. Rexolite is a trademark of C-LEC Plastics, Inc. in the United States, other countries or both. Dielectric inserts or plugs 32 are disposed within the passages 30 defined by the honeycomb structure 28. These dielectric inserts 32 facilitate the propagation of signals through the passages 30 such that the respective RF module 14 may transmit and/or receive signals via the dielectric loaded passages 30 defined by the honeycomb structure 28.

The phased array antenna 10 also may include a wide angle impedance match (WAIM) layer 34 that overlies the outer surface 28b of the honeycomb structure 28. The WAIM layer 34 may be constructed from a number of dielectric layers that mitigate the impact of mutual coupling effects on aperture performance at relatively high scan angles.

Assembling the previously described layers together results in the phased array antenna 10. In one embodiment, the phased array antenna is assembled by attaching the WAIM layer 34 to the honeycomb structure 28, followed by the PWB 26 and ending with the shim element layer 22. It should be understood that more layers may be included in the phased array antenna 10 or any of the above-mentioned layers need not be included. Further, various other arrangements may exist and embodiments of the present disclosure should not be limited to the above described arrangement.

Other layers may be attached to the phased array antenna 10 to form an antenna system 36. The antenna system 36 may include the phased array antenna 10, a thermal layer 38, an adapter plate 40 that connect to the phased array antenna 10 or other layers and/or devices. The thermal layer 38 connects with the phased array antenna 10 for various purposes, such as to remove heat from the phased array antenna portion 36. A thermal energy removal system 42 may be connected to the thermal layer, such as a water circulation system, so as to facilitate removal of heat from the phased array antenna 10 via the thermal layer 38. The adapter plate 40 may function to connect the phased array antenna 10 with other parts (not shown) of the antenna system 36, such as mounting devices, power supplies, and the like. While an exemplary assembled phased array antenna 10 is depicted in FIG. 1 and described above, other phased array antenna configurations may be employed and/or assembled in various other ways.

In another embodiment, the system may include an antenna to transmit data and another antenna to receive data, both of which communicate through a single aperture.

Figure 2:
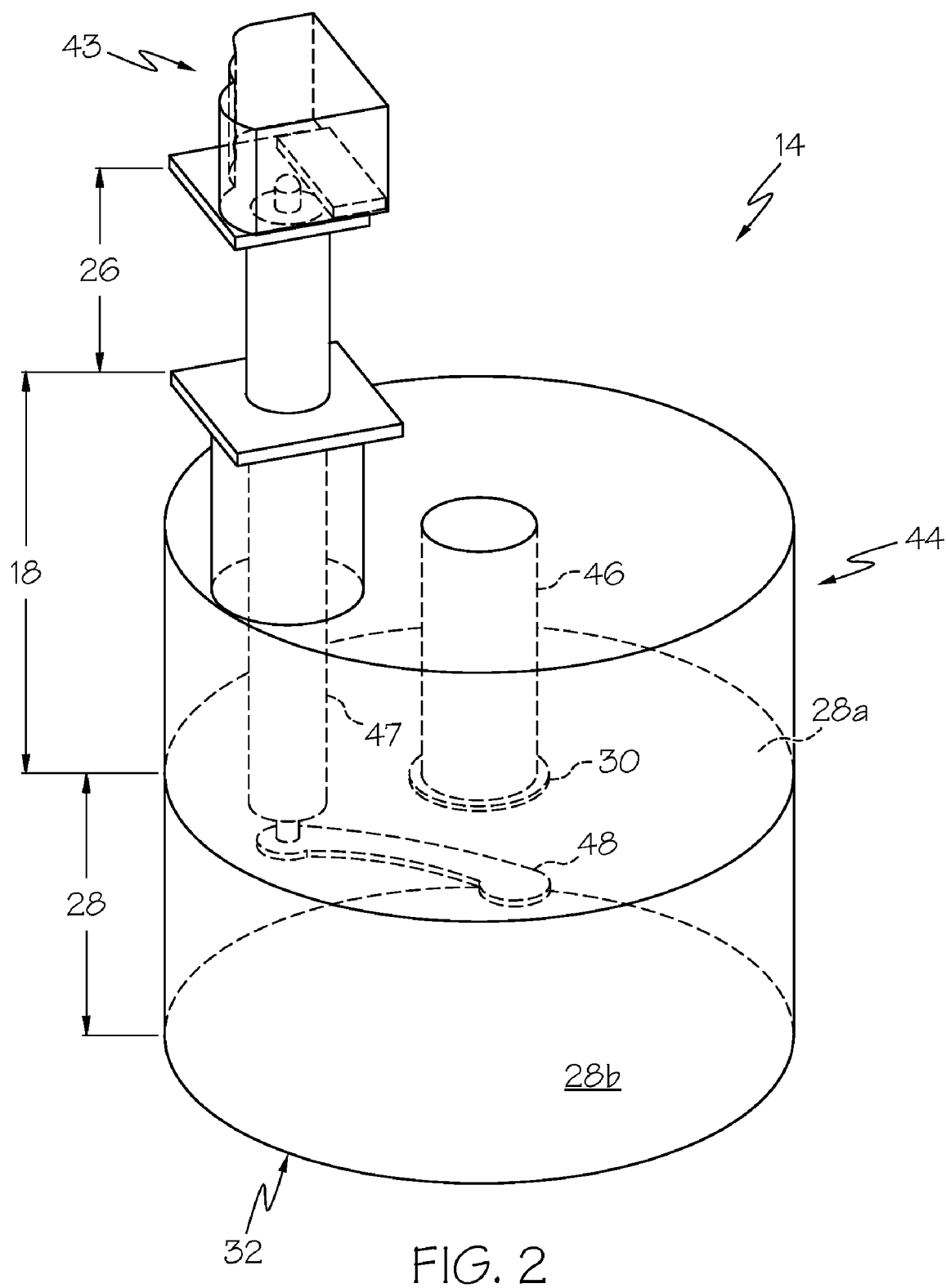
FIG. 2 is an example of a RF module of a phased array antenna in accordance with an embodiment of the present disclosure.

FIG. 2 is an example of a RF module 14 of a phased array antenna in accordance with an embodiment of the present disclosure. The RF module 14 may include a printed wiring board layer 26 and may be connected to a control circuit 43 and/or other electronics. The control circuit 43 may control the operation of the RF module, such as for example, the amplitude and phase of the electromagnetic radiation emitted by the RF module 14, the direction or orientation the RF module can send and receive and other operating characteristics of the RF module 14. In addition, RF module 14 may include a waveguide layer 18, which includes a radiator 44 or radiator layer and the passageways 30 of the honeycomb layer 28. The RF module 14 may further include the dielectric layer or plug 32 disposed in the honeycomb layer 28 as previous described. The radiator 44 or radiating element sends and receives electromagnetic or RF waves or signals. An example of a radiator that may be used with the RF module 14 will be described with reference to FIG. 3. The radiator 44 or radiator layer may be included in a multi-layer printed wiring board. Examples of such radiators are described by U.S. Pat. Nos. 6,670,930 and 6,989,791 which are assigned to the same assignee as the present application and are incorporated herein in their entirety by reference.

Figure 3:
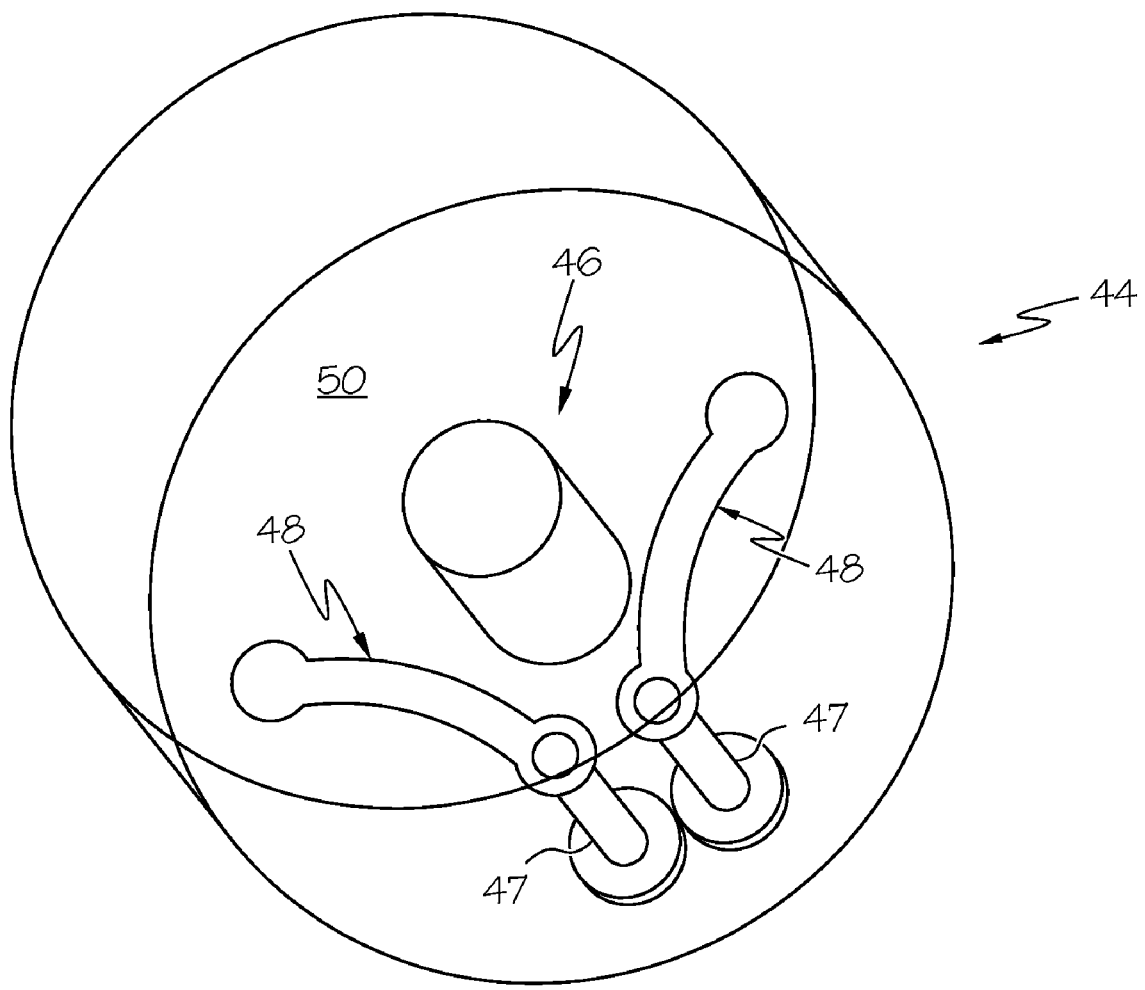
FIG. 3 is an example of a radiator of an RF module of a phased array antenna in accordance with an embodiment of the present disclosure.

Referring also to FIG. 3, FIG. 3 is an example of a radiator 44 of that may be used with the RF module 14 of a phased array antenna in accordance with an embodiment of the present disclosure. The radiator 44 may include a centerpin 46, two leads 47, two radiating coupling probes 48, and dielectric fill 50. Examples of a centerpin may be found in U.S. Pat. No. 6,989,791, entitled "Antenna-Integrated Printed Wiring Board Assembly for a Phased Array Antenna System" by Navarro et al., and assigned to the assignee as the present application and incorporated herein by reference. The probes 48 and the centerpin 46 are formed in the PWB layer 26. In the illustrated embodiment, each lead 47 is respectively connected to a respective probe 48 through the dielectric fill 50. The leads 47 connect the control circuit 43 with the probes 48 such that the control circuit 43 may transmit and/or receive electromagnetic energy to and from to the probes 48. For example, the probes 48 may be used to couple electromagnetic signals from space into the individual RF modules 14 and further to the electronics, the control circuit 43 or any other electronic device. Additionally, the probes 48 may be used to direct electromagnetic signals from the electronics or control circuit 43 out of the individual RF modules 14 into space. The probes 48 are illustrated as oriented orthogonally so as to receive circular polarization and resolve these signals into two linearly polarized component signals. It should be understood that the probes 48 may receive any type of polarization of electromagnetic energy. The probes 48 may be formed on the top surface of a Teflon-fiberglass substrate. The pattern of the probes 48 may be predetermined and a mask may be fabricated accordingly. The pattern of the probes 48 for the antenna array may be fabricated on the PWB substrate 26 via photolithography using such mask. Once the pattern of the probes 48 is etched into the PWB substrate 26, the substrate 26 is bonded on top of the dielectric fill 50. The probes 48 may be of any shape or size. For example, in the illustrative embodiment in FIG. 3, the probes are shown as having a curved shape. By changing the shape and/or size of the probes, the operating bandwidth of the phased array antenna may be varied. Examples of probes that may be used for probes 48 are described in U.S. Pat. No. 6,670,930, entitled "Antenna-Integrated Printed Wiring Board Assembly for a Phased Array Antenna System" by julio Navarro, and U.S. Pat. No. 6,989,791, entitled "Antenna-integrated Printed Wiring Board Assembly for a Phased Array Antenna System" by Julio Navarro, both of which are assigned to the same assignee as the present application and are incorporated herein by their entirety by reference. The dielectric fill 50 of the radiator 44 may be any type of dielectric material, such as Rexolite.

The centerpin 46 may be of any shape or size. For example, in the illustrative embodiment in FIG. 3, the centerpin 46 is shown as having a cylindrical shape. The centerpin 46 may function as a tuning element to increase impedance matching of the phased array antenna 10. By changing the dimensions of the centerpin 46, the S11 and S22 parameters can be lowered over a wide operating frequency. For example, the diameter of the centerpin 46, the length of the centerpin 46, and/or the shape of the centerpin 46 can be varied to obtain a desired bandwidth. An exemplary centerpin is described in U.S. Pat. No. 6,989,791.

In addition to varying and/or optimizing the shape and/or size of the centerpin 46 and probes 48, the shape and size of the plugs 32 may also be varied and/or optimized to increase operating bandwidth of the phased array antenna 10.

Figure 6:
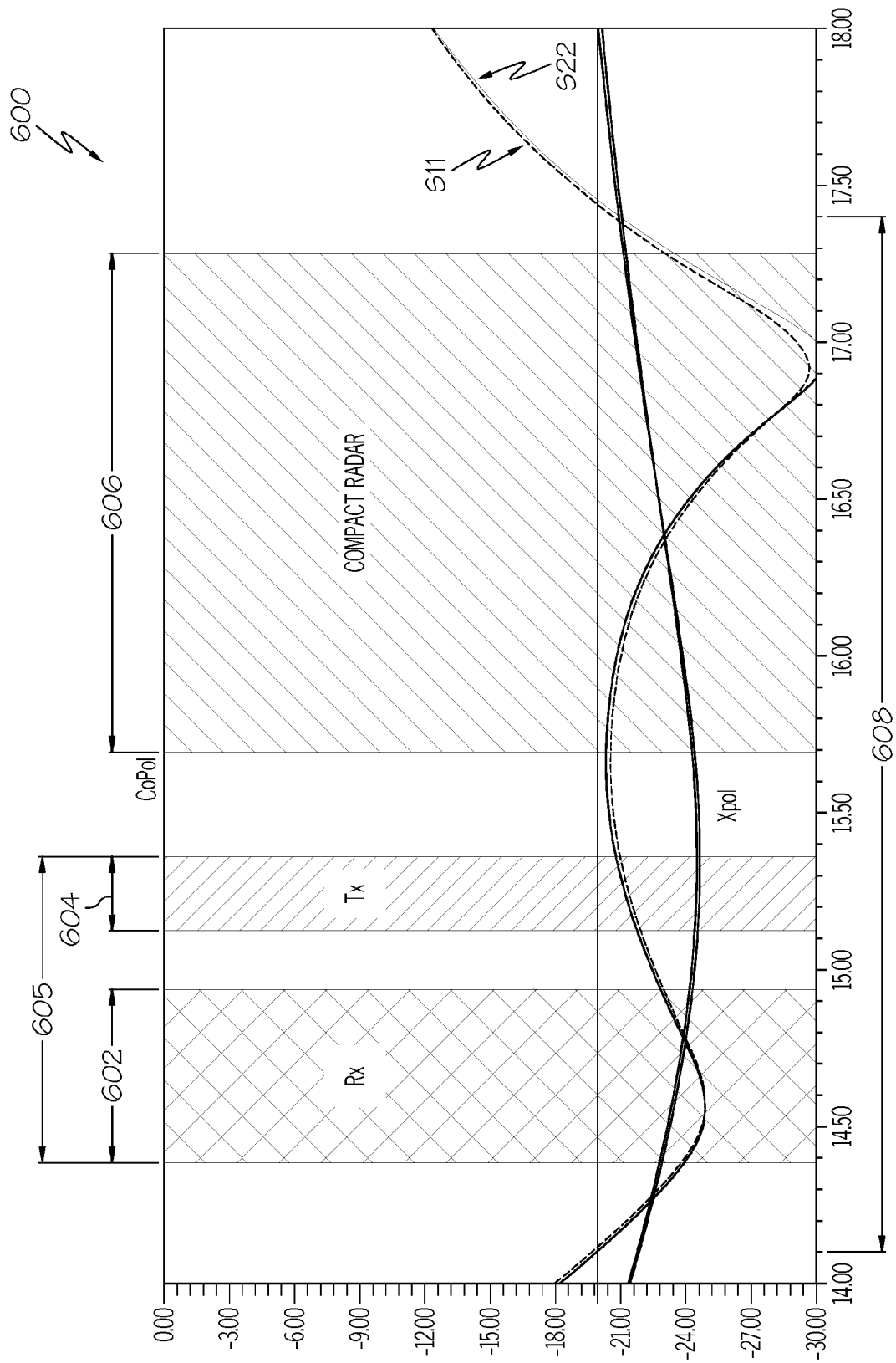
FIG. 6 is a graph of the S-parameters of the radiator of FIG. 3.

As described in more detail with reference to FIG. 6, the shape and size of the plugs 32, centerpin 46, probes 48, and leads 47 may be designed together to achieve optimal impedance matching, S-parameters, and the like.

Figure 4:
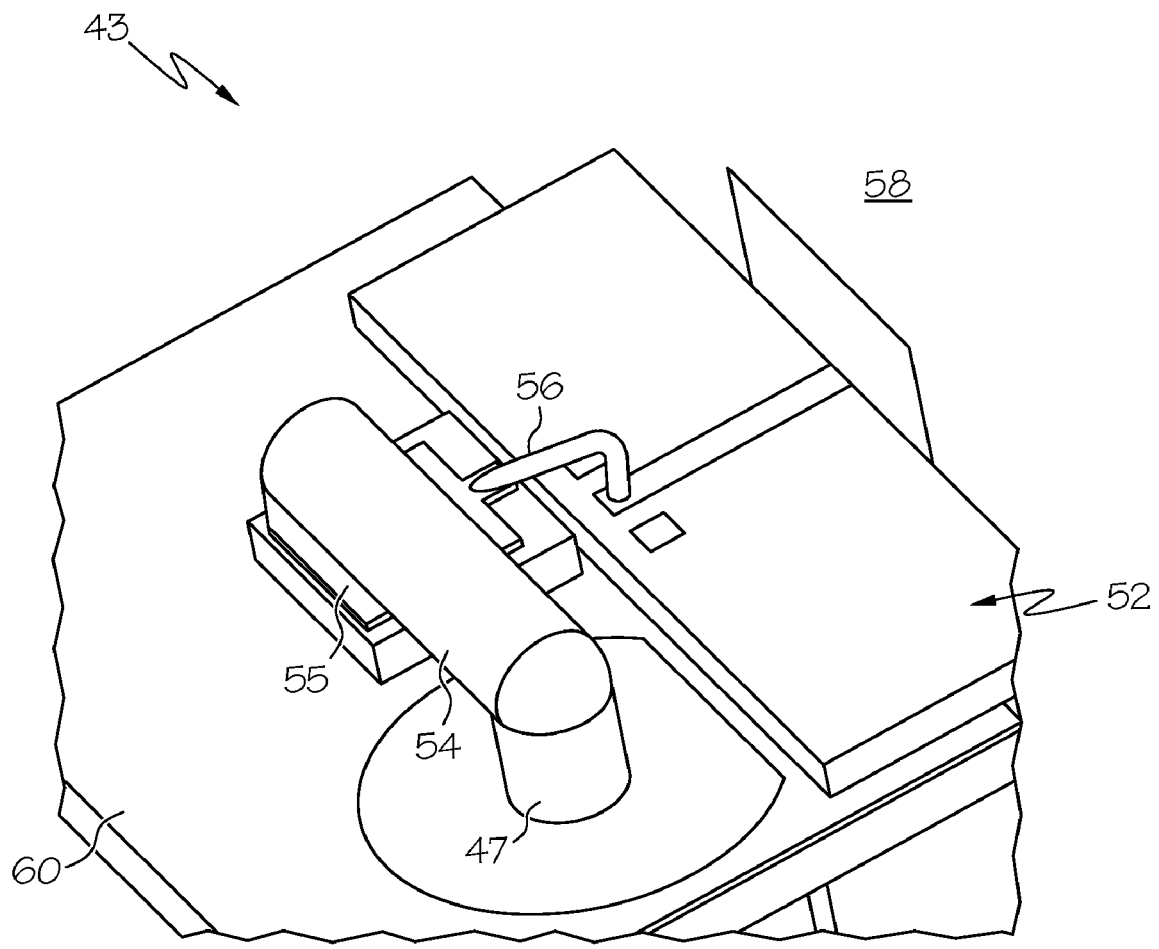
FIG. 4 an example of a control circuit of a phased array antenna in accordance with an embodiment of the present disclosure.

FIG. 4 is an example of an electrical control circuit 43 of the phased array antenna 10 in accordance with an embodiment of the present disclosure. As best shown in FIG. 2, the radiator 44 may be connected to the control circuit 43 via the probe 48 and lead 47 or probes 48 and respective leads 47. The control circuit 43 may be connected with the PWB layer 26 (FIG. 2) so as to deliver energy to the phased array antenna 10. The leads 47 may connect the probes 48 to a P-I-N diode in the control circuit 48, such as a vertical PIN diode chip (VPIN) 52. The VPIN 52 may include at least one limiter and at a switch limiter. The VPIN 52 is electrically connected to a wire 54 which in turn is connected to the lead 47. The wire 54 is connected to the VPIN 52 via a bond wire 56 which may be soldered to the wire 54 by a solder connection 55 or by other electrical connection means. The VPIN 52, wire 54, bond wire 56, other electronics and other elements of the control circuit 43 may be sealed with a dielectric layer 58. Also, the elements of the control circuit 43 may all be connected to a substrate 60. In one embodiment a circulator or a FET switch could be used in lieu of or in addition to the VPIN 52. The operation of the VPIN 52 is described in more detail below with reference to FIG. 5.

In accordance with other embodiments of the present disclosure, a system for communications and radar may include other radiator types and aperture configurations. Examples of such radiator types and aperture configurations can be found in U.S. Pat. Nos. 6,424,313; 6,580,402; 6,714,163; 6,900,765; 7,187,342; and 7,417,598.

Figure 5:
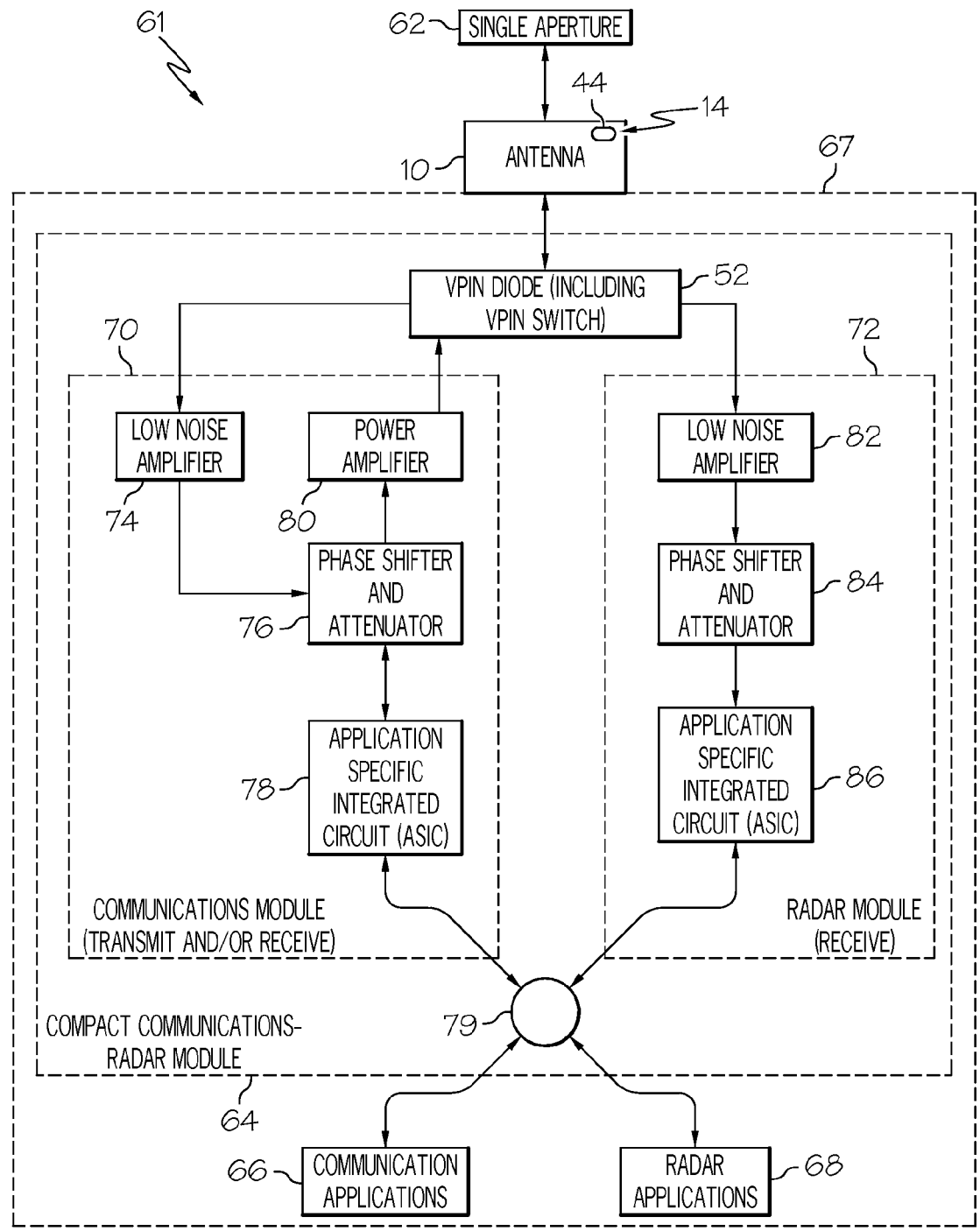
FIG. 5 is a block diagram of an example of a phased array antenna system in accordance with an embodiment of the present disclosure.

FIG. 5 illustrates an example of a phased array antenna system 61 in accordance with an embodiment of the present disclosure. As illustrated, the phased array antenna system 61 includes a single aperture 62, the phased array antenna 10, a compact communications-radar module 64, communications applications 66 and radar applications 68. Similar to that previously described, the phased array antenna 10 may include a plurality of RF modules 14. The compact communications-radar module 64 is a portion of the control circuit 43 and includes a first module or a communications module 70 and a second module or a radar module 72 to the same VPIN chip 52.

During communications, the PWB 26 routes a RF signal to each radiator 44 as well as provide positive and negative bias voltages and control signals. These control signals provide information to an application specific integrated circuit (ASIC) which determines whether an RF module 14 is in transmit mode or receive mode. Further, the control signals also control the settings of the phase shift and attenuator 76, 84 required for operation.

The communications module 70 both transmits and receives data while the radar module 72 receives data captured via the phased array antenna 10. In one embodiment, the communications module 70 and the radar module 72 transmit and receive data simultaneously through the single common aperture 62.

To transmit data or electrical signals out of the phased array antenna 10 and into space or other medium, the data may originate from the communications applications 66 and may be transmitted through the ASIC 76 to the phase shifter and attenuator 76. During such transmission cycle, the RF signal is routed through the PWB 26 to the ASIC 78 and to the phase shifter and attenuator 76. The phase shifter 76 may be controlled by the user and allows the electromagnetic beam to be controlled and steered in any direction. The output of the phase shifter and attenuator 76 is fed into a power amplifier 80 to increase the power of the signal which is fed into the VPIN 52. The power amplifier 80 may include a driver amplifier and a high power amplifier. After receiving the RF signal, the power amplifier 80 output is fed to the VPIN 52, which selects either of the two linear polarizations of the signal. The signal then radiates out from the antenna 10 and is reflected from a target. The signal is received by the radiator 44 and it reaches the VPIN 52.

In receiving data, the antenna 10 captures electromagnetic signals via the single aperture 62 and transmits the signal through to the VPIN 52. The VPIN 52 may include a limiter (not shown) which ensures that the voltage and current sent to a low noise amplifier (LNA) 74 does not exceed the amount of power the LNA 74 can handle. After receiving the communications signal, the VPIN 52 routes each of the two linear polarizations in the communications module 70 to the LNA 74. Each LNA 74 amplifies the signal and feeds it to the phase shifter and attenuator 76. The phase shifter and attenuator 76 then pass the signal to the ASIC 78 and back into the PWB 26. The PWB 26 then routes each of the signals from all of the unit cells or RF modules 14 back into a common port 79 to a receiver of the application 66, 68.

In one embodiment, while the communications module 70 transmits and/or receives electromagnetic signals, the radar module 72 of the antenna may also receive radar signals. After receiving the electromagnetic signals from the antenna 10, a low noise amplifier (LNA) 82 of the radar module 72 receives and amplifies the signal, sending the amplified signal to the phase shifter and attenuator 84. The output of the phase shifter and the attenuator 84 is fed into the ASIC 86 of the radar module 72. In one embodiment, the data from the radar module 72 may be routed to the communications module 70 so as to share the radar data between various devices, such as between military vehicles, aircrafts, unmanned aircraft and military control centers, and the like.

As previously described, the shape and size of the plugs 32, centerpin 46, probes 48, and leads 47 as best shown in FIGS. 2 and 3 may be designed together for use with the phased array antenna system 61 to achieve optimal impedance matching, S-parameters, and the like for both communications applications and radar applications using the single aperture 62. In one exemplary embodiment, each plug 32 may have a diameter of about 0.337 inches, the centerpin 46 may have a diameter of about 0.068 inches, and each lead 47 may have a diameter of about 0.020 inches. FIG. 6 is a graph 600 of the S-parameters of the radiator of such configuration. The S11 and S22 parameters are shown as being less than a predetermined level (e.g. −20 dB) over a full operating bandwidth, such as from about 14 GHz to about 17.50 GHz, as illustrated by reference numeral 608. The RF module 64 of this example may receive electromagnetic energy for communications from the output of the antenna 10 over a first frequency range (as shown by reference numeral 602 in FIG. 6), such as about 14.4 GHz to about 14.9 GHz, and may transmit electromagnetic energy for communications from the antenna 10 over a second frequency range (as shown by reference numeral 604 in FIG. 6), such as about 15.1 GHz to about 15.4 GHz. Thus, the RF module allows for two-way communications over a frequency range 605 of 14.4 GHz to 15.4 GHz. As illustrated by reference numeral 606 in FIG. 6, the RF module 64 may operate to send and receive electromagnetic energy for radar applications 68 from the antenna 10 over a third frequency range, such as about 15.7 GHz to about 17.3 GHz. Thus, both the communications applications 66 and the radar applications 68 of the communication radar system 61 have S11 and S22 parameters less than a predetermined level (e.g. −20 dB) over the full operating bandwidth, such as about 14 GHz to about 17.50 GHz. It should be understood that the shape and size of the plugs 32, centerpin 46, probes 48 and leads 47 may be changed to achieve a different bandwidth and/or more desirable S-parameters. For example, in one embodiment, the antenna may be designed to work over any frequency band, such as KU-Band of 12 GHz to 18 GHz, X-band of 7 GHz to 12.5 GHz, K-Band of 18 GHz to 27 GHz, C-Band of 4-8 GHz, or any other frequency band of the electromagnetic spectrum. Regardless, the RF module 64 may allow transmission and/or reception of electromagnetic energy via the same phased array antenna 10 and via the single common aperture 62 for both communications applications 66 and radar applications 68.

The phased array antenna system 61 may be used in varying applications. For example, the phased array antenna system 61 may be mounted to any vehicle 67, such as an aerospace vehicle, terrestrial vehicle or rover, watercraft or other object. The phased array antenna system 61 may be mounted to such vehicle using a single aperture and may be part of one or more ad-hoc networks so as to be in communication with one or more other vehicles, base stations or any other device on a network.

In another embodiment, an ad-hoc network can be maintained with a group of mobile nodes through the use of electronically-agile antennas, at least one of which is the phased-array antenna system 61. When not transferring data, the phased-array antenna system 61 may be used in a sensing mode to gather data about its environment. The multi-mode sensor may include functions such as synthetic aperture radar, ground-moving target indicator, sense and avoid feature, automatic target recognition and other like functions. Once the data is gathered, the data is then transferred to a predetermined destination through the multi-node network. A benefit of this mobile ad-hoc network is that a direct line-of-sight between the origin of the data and final recipient is not required. Once the network is formed, each address is accessible to all members or participants on the network. The details of exemplary mobile ad-hoc network architecture are described in U.S. Patent Application Publication Number 2007/0087758 to Norris et al., entitled "Method of Forming Directional Wireless Networking Using In-Band Channels," assigned to the same assignee as the present application and incorporated herein in its entirety by reference. The benefits of using directional phased arrays for such a system are described in U.S. Pat. No. 7,312,751 issued to Voyce et al., entitled "Phased Array Antenna System to Achieve Suppression of Undesired Signal Components," assigned to the same assignee as the present application and incorporated herein in its entirety by reference.

Embodiments of the system of the present disclosure can be directly applied to any group of terrestrial, airborne or space platforms. For example, such system may be applied to commercial airliners. At any one instant, hundreds of airplanes fly in view of each other. An ad-hoc communication system in place on the airplanes would permit each airplane to become an addressable node in the network providing a data rate of at least about 300 Mb/s without the need for or the latency encountered in uploading and downloading data from satellites. In implementing such a system, airports with high traffic may have more nodes in order to support the higher throughput.

The terminology used herein is for the purpose of describing particular embodiments only and is not intended to be limiting of the disclosure. As used herein, the singular forms "a", an and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the disclosure has other applications in other environments. This application is intended to cover any adaptations or variations of the present disclosure. The following claims are in no way intended to limit the scope of the disclosure to the specific embodiments described herein.

What is claimed is:

1. A system for a mobile ad-hoc communications network, comprising:
   a single antenna aperture;
   a phased array antenna comprising a plurality of radiators communicating electromagnetically via the single antenna aperture; and
   a control circuit communicatively connected to the phased array antenna, comprising:
      a communications module for transmitting and receiving communication data via the phased array antenna through the single antenna aperture; and
      a radar module for transmitting and receiving radar signals via the phased array antenna through the single antenna aperture.

2. The system of claim 1, wherein the single aperture is the only aperture for the phased array antenna.

3. The system of claim 1, wherein the communications module and the radar module are configured to simultaneously transmit and receive signals via the phased array antenna and the single aperture.

4. The system of claim 1, wherein the phased array antenna further comprises a wide angle impedance matching (WAIM) layer comprising a layer of dielectric material, wherein the WAIM is connected to the plurality of radiators.

5. The system of claim 1, wherein the S-11 and S-22 parameters of each antenna of the plurality of antennas are less than a predetermined dB level over a full operating bandwidth of the communications module and the radar module.

6. The system of claim 5, wherein the mobile ad hoc network operates over a frequency bandwidth comprising a first frequency range, a second frequency range and a third frequency range, and wherein a transmit mode of the communications module operates within the first frequency range, a receive mode of the communications module operates within the second frequency range, and the radar module operates within the third frequency range.

7. The system of claim 6, wherein the frequency bandwidth of the mobile ad hoc network comprises about 14.4 Ghz to about 17.3 Ghz.

8. The system of claim 1, wherein the radiator comprises at least one probe, at least one lead, and at least one centerpin.

9. The system of claim 1, wherein each radiator is formed on a printed wiring board (PWB), the PWB being positioned between a wide angle impedance matching layer and the control circuit.

10. The system of claim 1, wherein each radiator comprises two probes and a centerpin configured to transmit and receive electromagnetic signals.

11. The system of claim 1, wherein the communications module and the radar module are connected to and are channeled through at least a single VPIN chip.

12. The system of claim 1, wherein the communications module and radar module are communicatively connectable to share data between each other.

13. The system of claim 12, wherein the phased array antenna is part of an ad-hoc network.

14. The system of claim 1, wherein the phased array antenna comprises:
a structure having a pair of opposed planar surfaces;
a plurality of passages extending between the opposed planar surfaces, wherein the passages are arranged in a predefined pattern or array corresponding to an arrangement of the plurality of radiators;
a dielectric insert formed in each of the plurality of passages to permit propagation of signals through the passage from a respective one of the radiators.

15. The system of claim 1, wherein the phased array antenna comprises a plurality of RF modules, wherein each of the plurality of RF modules comprises:
a portion of a honeycomb structure;
a passageway extending through the portion of the honeycomb structure
a waveguide layer disposed on the honeycomb structure, wherein the waveguide layer includes one of the plurality of radiators positioned for transmitting and receiving signals through the passageway extending through the honeycomb structure; and
a printed wiring board to connect the RF module to the control circuit.

16. The system of claim 1, wherein the system is mounted to a vehicle.

17. The system of claim 1, wherein the phased array antenna and single antenna aperture define a node in the mobile ad-hoc communications network.

18. A system for communications and radar, comprising:
a common aperture;
a phased array antenna coupled to the single aperture, wherein the phased array antenna comprises:
a wide angle impedance matching (WAIM) layer comprising a dielectric layer;
a radiator layer attached to the WAIM layer and comprising at least one probe and at least one centerpin spaced apart from the at least one probe;
a circuit connected to the radiator layer of phase array antenna to deliver power to the at least one probe and the centerpin, wherein the circuit comprises:
a communications module for transmitting and receiving data via the phased array antenna through the single antenna aperture; and
a radar module for transmitting and receiving radar data via the phased array antenna through the single antenna aperture.

19. The system of claim 18, wherein the centerpin comprises a metal cylinder having a predetermined diameter.

20. A method for transmitting and receiving communication and radar signals, comprising:
transmitting and receiving communication signals and radar signals through a single antenna aperture of a phased array antenna;
directing the received radar signals to a radar module for transmitting and receiving radar signals; and
directing the received communications signals to a communications module for transmitting and receiving communications signals.

21. The method of claim 20, further comprising directing the transmitted communications signals from the communications module through the single aperture.

22. The method of claim 20, wherein the transmitting communication signals comprises transmitting signals having information associated with the received radar signals.

* * * * *